J. KLEIDMAN.
GEOMETRICAL INSTRUMENT.
APPLICATION FILED JULY 12, 1917.

1,267,323.

Patented May 21, 1918.
2 SHEETS—SHEET 1.

INVENTOR.
J. Kleidman
BY Sigmund Herzog
his ATTORNEY

J. KLEIDMAN.
GEOMETRICAL INSTRUMENT.
APPLICATION FILED JULY 12, 1917.
1,267,323.
Patented May 21, 1918.
2 SHEETS—SHEET 2.
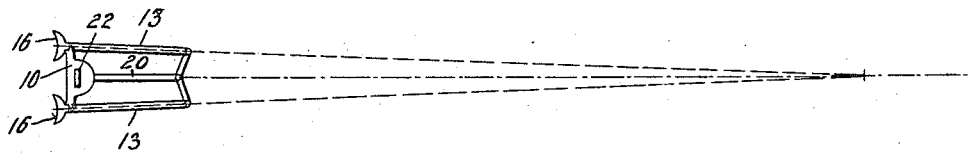
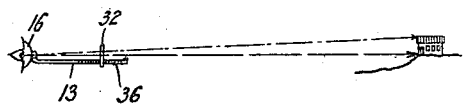
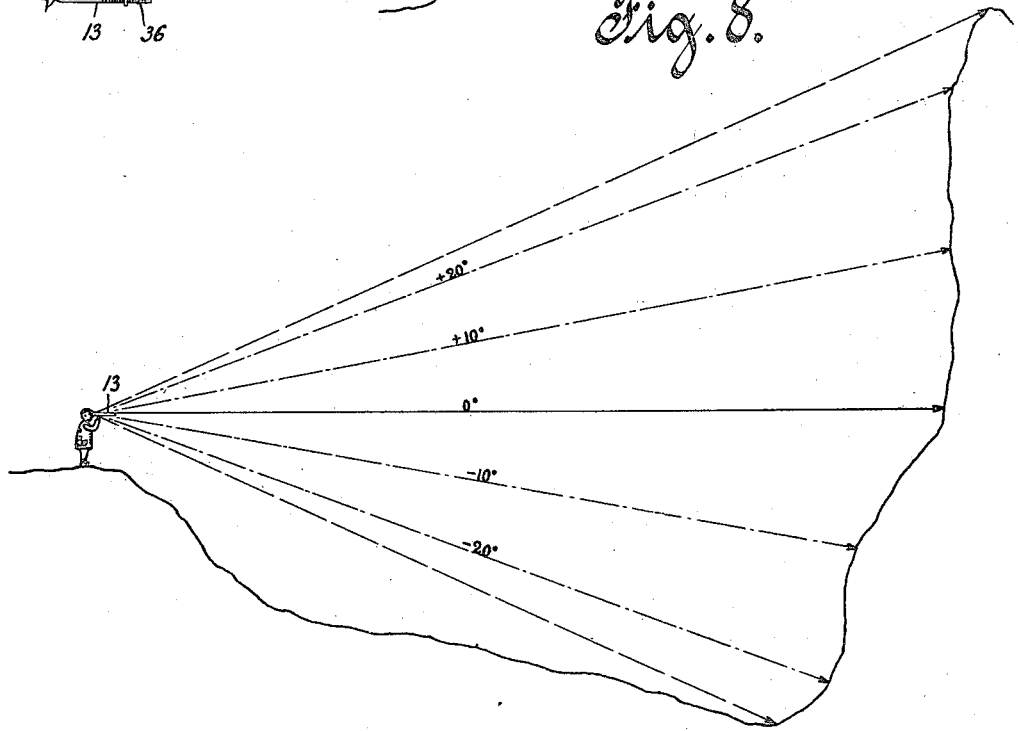
INVENTOR.
J. Kleidman
BY Sigmund Herzog
his ATTORNEY

UNITED STATES PATENT OFFICE.

JOSEPH KLEIDMAN, OF NEW YORK, N. Y.

GEOMETRICAL INSTRUMENT.

1,267,323.  Specification of Letters Patent.  Patented May 21, 1918.

Application filed July 12, 1917. Serial No. 180,159.

*To all whom it may concern:*

Be it known that I, JOSEPH KLEIDMAN, a subject of the Czar of Russia, and a resident of the city of New York, in the county of Kings and State of New York, have invented certain new and useful Improvements in Geometrical Instruments, of which the following is a specification.

The present invention relates to instruments specially designed for determining the distance of remote objects without actually traversing the intervening space; in other words the invention relates to measuring instruments of that type which are generally known as range-finders.

The main object of the invention is to provide an instrument of the type mentioned which is of simple construction and which may be easily manipulated for determining directly the distance, that is without calculations being made from the data obtained by observation with the instrument.

Another object of the invention is to produce a range-finder that serves at the same time as a vertical-angle measurer, thereby permitting, by observation and calculation, to ascertain the altitude of a given point above or below the level of the observer and also the heights of distant objects.

A further object of the invention is to combine with the range-finder a simple and efficient means for ascertaining directly the size or dimensions of a distant object.

With these and other objects in view, which will more fully appear as the nature of the invention is better understood, the same consists in the combination, arrangement, and construction of parts hereinafter described, pointed out in the appended claims and illustrated in the accompanying drawings, it being understood that many changes may be made in the size and proportion of the several parts and details of construction within the scope of the appended claims without departing from the spirit or sacrificing any of the advantages of the invention.

One of the many possible embodiments of the invention is illustrated in the accompanying drawings, in which:—

Figure 1:
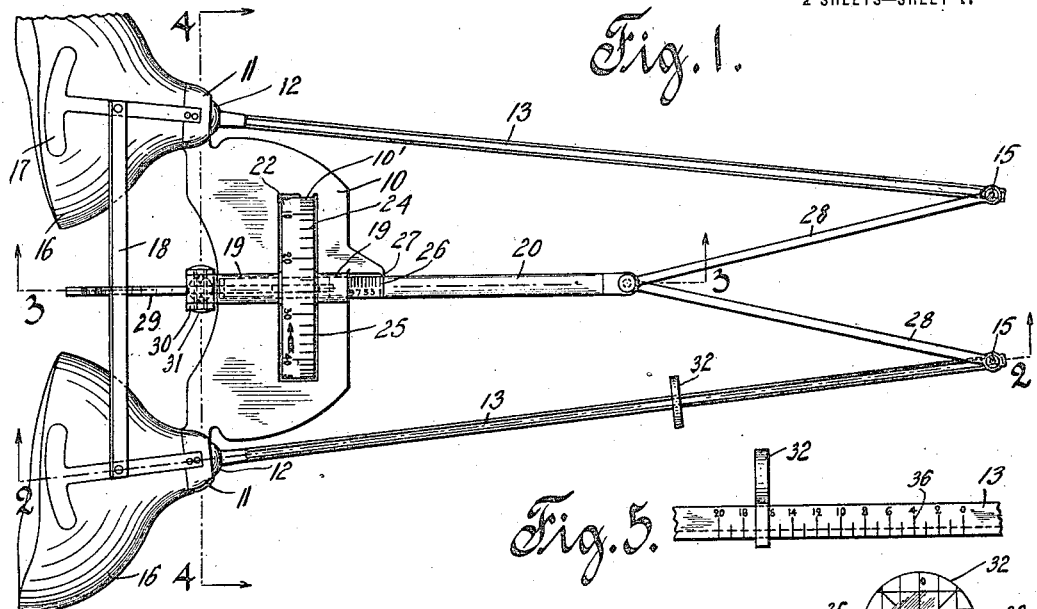
Figure 5:
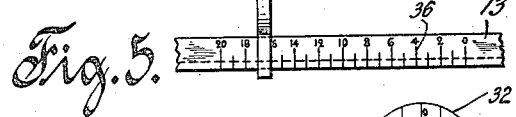
Figure 2:
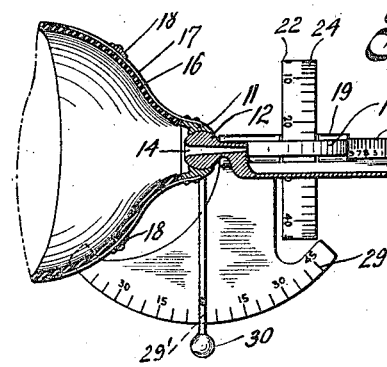
Figure 6:
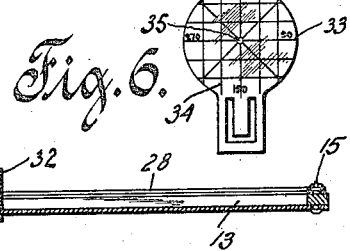
Figure 3:
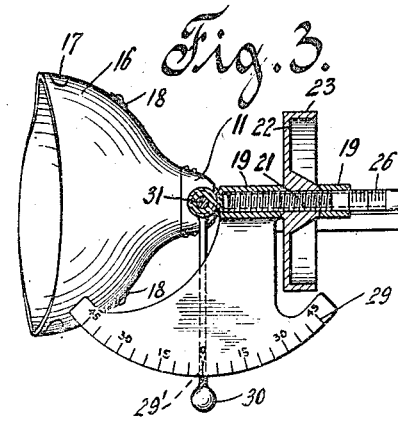
Figure 4:
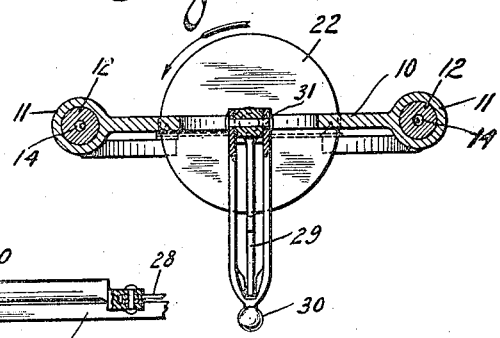

Figure 1 is a top plan view of an instrument constructed in accordance with the present invention; Fig. 2 is a section taken on line 2—2 of Fig. 1; Fig. 3 is a section taken on line 3—3 of Fig. 1; Fig. 4 is a section taken on line 4—4 of Fig. 1; Fig. 5 is a side elevation of a detail of construction; Fig. 6 is a front elevation of the detail shown in Fig. 5; Fig. 7 is a diagram illustrating the use of the invention as a range finder; Fig. 8 is a diagram illustrating the use of the invention as a vertical-angle measurer; and Fig. 9 is a diagram illustrating the use of the invention as a means for ascertaining the dimensions of a distant object.

In the drawings, the numeral 10 indicates a normally horizontally disposed base plate, preferably made of metal, upon which are formed two sockets 11, in which are mounted the ball-shaped inner or rear ends 12 of sight bars 13. These bars are in the case illustrated in the drawings transversely of U-shaped cross-section, and provided in their ball-shaped rear ends with sight holes 14, in alinement with which are mounted upon the front ends of said bars pin-point sights 15. The distance between the sight holes 14 corresponds to that between the eyes of a normal person. To each socket 11 is attached a substantially semi-globular hollow rubber body 16, that is in use firmly pressed against the face of the observer, to exclude light, other than that passing through the sight holes 14. These rubber members are reinforced by metal pieces 17, and connected by transversely extending metal strips 18.

Upon the base plate 10 are formed bearings 19, in which is slidably mounted a horizontally extending spindle 20. The axis of this spindle intersects at right angles the middle of the connecting line of the sight holes 14, or, in other words, the connecting line between the pivots of the bars 13. The axis of the spindle may thus be termed the longitudinal axis of the apparatus. The rear end of the spindle is provided with screw-threads 21, meshing with interior screw-threads of a disk 22, that is provided upon its periphery with a flange 23, on which is marked a graduated scale 24. There are one hundred graduations on this scale, said graduations being located equidistantly. The disk 22 extends through a slot 25 in the base plate 10, and is thus prevented from shifting in the direction of the longitudinal axis of the spindle 20. Upon the spindle are marked graduations 26, coöperating with a stationary pointer 27 upon the base plate 10. The pitch of the screw-threads on the spindle 20 and disk 22 is such that, while the said disk makes a complete turn, the spindle moves a distance corresponding to that between two adjoining graduations on the scale 26, and the pitch has been previously calculated as will be hereinafter set forth. To the front end of the spindle 20 are pivoted the rear ends of two links 28, the other ends of which are pivoted to the front ends of the sight bars 13. Preferably, the pin-point sights constitute the pivots that attach the links 28 to the bars 13.

In the longitudinal center line of the apparatus is fixedly attached to the base plate 10 a vertical segmental scale 29, with which coöperates a pendulum 30, that is pivoted at 31 to the said base plate. The scale is provided with degree graduations, oppositely extending from the zero line 29'. The pendulum coincides with this zero line when the base plate 10 is disposed horizontally.

Upon one of the sight bars 13 is slidably disposed a transparent plate member 32, provided with degree graduations 33 and with size graduations 34. In the center of the plate member 32 is formed a hole 35, to permit of a proper sighting. One of the sides of that sight bar 13, upon which the member 32 is adapted to slide, is provided with graduations 36, the graduations 36 and 34 being calculated previously in a manner hereinafter to be fully set forth.

The operation of this device is as follows: When used as a range-finder, the theory of the device is that of distance instruments having sighting devices at either end of a member of known length, which forms the base of the triangle of calculation. In these last mentioned instruments, however, double observations are necessary, while in this instance the two sighting members are interconnected, with the result that a single observation only becomes necessary. The scale 26 is calculated in such a manner that the distance between two graduations or, in other words, a complete turn of the disk 22 corresponds to one hundred feet distance in the field. Consequently, the distance between two graduations on the flange 23 corresponds to a distance of one foot in the field.

The manner of employing the instrument as a range-finder is illustrated in Fig. 7 of the drawings; more particularly Fig. 7 illustrates diagrammatically the manner in which the distance of a point in a horizontal plane in which the base plate 10 is located is found. For this purpose, obviously, the base plate must be kept horizontal, so that the pendulum 30 points to the zero mark on the scale 29 above referred to. The operator sights through the holes 14, bringing, by turning the disk 22 in one or the other direction, the pin-point sights 15 on the sight bars 13 into alinement with the object. The distance of the object can then be read off in feet from the scales 26 and 24, the pointer 27, in conjunction with the scale 26, giving the distance in hundred feet, and a pointer 10' on the base plate 10, in conjunction with the scale 24, giving the fraction of one hundred feet. Attention is called to the fact that the sighting bars move in unison, that is the angles, at which they intersect the connecting line between their pivots, are always equal.

If it is intended to calculate the height of a distant object, first its highest point and then a point at its base is sighted (Fig. 8). In both cases, obviously, the base plate 10 and the parts carried thereby must be inclined correspondingly, the degree of inclination being readable in both directions on the scale 29, by reason of the fact that the pendulum will remain vertical. When sighting the highest point and point at the base of the object, the distances are read off in the same manner as when the device is used as a common range-finder. The distance of the two points mentioned and the angles of inclination being thus known, the height of the object can be easily obtained from a generally known trigonometrical formula. The use of the instrument for determining the relative elevation or declination of a point from the observer is obvious from the foregoing.

When using the instrument for determining the size or dimensions of a distant object, first the distance of the object from the observer is ascertained in the manner above described. After this the member 32 is slid along the scale 36 until it coincides with a graduation of said scale which corresponds to the distance mentioned (Fig. 9). The observer then sights again the object through the member 32, and reads off the graduations 34 both as to height and length, observing at the same time the angles of inclination of its outlines by aid of the graduations 33. The graduations 34 and 36 are obtained previously by experiments.

What I claim is:

1. A range-finder comprising a base plate, two sighting bars pivoted thereto and spaced apart a distance equal to the distance between the eyes of a normal person, a spindle shiftably disposed upon said base in a line intersecting at right angles the middle of the connecting line between the pivots of said bars, said spindle having distance graduations, links connecting said spindle and bars, and means for shifting said spindle upon said base and thereby causing said bars to converge or diverge.

2. A range-finder comprising a base plate, two sighting bars pivoted thereto and spaced apart a distance equal to the distance between the eyes of a normal person, a spindle shiftably disposed upon said base in a line intersecting at right angles the middle of the connecting line between the pivots of said bars, said spindle having distance graduations, and means connecting said spindle and said bars whereby a shifting of said spindle causes both bars to converge or diverge.

3. A range-finder comprising a base plate, two sighting members pivoted thereto and spaced apart a distance equal to the distance between the eyes of a normal person, a distance-graduated member shiftably mounted upon said base, and connecting means between said sighting members and said shifting member, whereby upon shifting the latter both sighting members are caused to converge or diverge.

4. A range-finder comprising a base plate, two sighting members pivoted thereto and spaced apart a distance equal to the distance between the eyes of a normal person, a distance-graduated spindle shiftably mounted upon said base and provided with screw-threads, a graduated disk rotatably mounted upon said spindle provided with screw-threads meshing with those of said spindle, said disk being held upon said base against motion in the direction of the longitudinal axis of said spindle, and means connecting said spindle and said sighting members, whereby upon rotating said disk said sighting members are caused to converge or diverge.

5. A range-finder comprising a base plate, two sighting bars pivoted thereto and spaced apart a distance equal to the distance between the eyes of a normal person, a spindle shiftably disposed upon said base in a line intersecting at right angles the middle of the connecting line between the pivots of said bars, said spindle having distance graduations, links connecting said spindle and bars, means for shifting said spindle upon said base and thereby causing said bars to converge or diverge, a vertically disposed segment upon said base plate having degree graduations, and a pendulum pivoted to said base plate coöperating with said last named graduations.

6. A range-finder comprising a base plate, two sighting bars pivoted thereto and spaced apart a distance equal to the distance between the eyes of a normal person, a spindle shiftably disposed upon said base in a line intersecting at right angles the middle of the connecting line between the pivots of said bars, said spindle having distance graduations, means connecting said spindle and said bars whereby a shifting of said spindle causes both bars to converge or diverge, a vertically disposed segment upon said base plate having degree graduations, and a pendulum pivoted to said base plate coöperating with said last named graduations.

7. A range-finder comprising a base plate, two sighting bars pivoted thereto and spaced apart a distance equal to the distance between the eyes of a normal person, a distance-graduated member shiftably disposed upon said base, connecting means between said last mentioned member and said bars, whereby upon shifting said member both bars are caused to converge or diverge, a vertically disposed segment upon said base plate having degree graduations, and a pendulum pivoted to said base plate coöperating with said last named graduations.

8. A range-finder comprising a base plate, two sighting members pivoted thereto and spaced apart a distance equal to the distance between the eyes of a normal person, a distance-graduated member shiftably mounted upon said base, connecting means between said sighting members and said shifting member, whereby upon shifting the latter both sighting members are caused to converge or diverge, a vertically disposed segment upon said base plate having degree graduations, and a pendulum pivoted to said base plate coöperating with said last named graduations.

9. A range-finder comprising a base plate, two sighting members pivoted thereto and spaced apart a distance equal to the distance between the eyes of a normal person, a distance-graduated spindle shiftably mounted upon said base and provided with screw-threads, a graduated disk rotatably mounted upon said spindle provided with screw-threads meshing with those of said spindle, said disk being held upon said base against motion in the direction of the longitudinal axis of said spindle, means connecting said spindle and said sighting members, whereby upon rotating said disk said sighting members are caused to converge or diverge, a vertically disposed segment upon said base plate having degree graduations, and a pendulum pivoted to said base plate coöperating with said last named graduations.

10. A range-finder comprising a base plate, two sighting members pivoted thereto and spaced apart a distance equal to the distance between the eyes of a normal person, means connecting said sighting members for causing the same to move simultaneously into sighting position, a vertically disposed segment upon said base plate having degree graduations, and a pendulum pivoted to said base plate coöperating with said last named graduations.

11. A range-finder comprising a base plate, two sighting members pivoted thereto and spaced apart a distance equal to the distance between the eyes of a normal person, means connecting said sighting members for causing their longitudinal axes to intersect the connecting line between the pivots of said sighting members at equal angles, a vertically disposed segment upon said base plate having degree graduations, and a pendulum pivoted to said base plate coöperating with said last named graduations.

Signed at New York, in the county of New York, and State of New York, this 10th day of July, A. D. 1917.

JOSEPH KLEIDMAN.

Copies of this patent may be obtained for five cents each, by addressing the "Commissioner of Patents, Washington, D. C."